(12) United States Patent
Xie et al.

(10) Patent No.: US 10,938,546 B2
(45) Date of Patent: Mar. 2, 2021

(54) COMMUNICATION METHOD, BASE STATION, AND TERMINAL DEVICE

(71) Applicant: HUAWEI TECHNOLOGIES CO., LTD., Guangdong (CN)

(72) Inventors: Xinqian Xie, Beijing (CN); Zhiheng Guo, Beijing (CN); Wei Sun, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/368,629

(22) Filed: Mar. 28, 2019

(65) Prior Publication Data

US 2019/0222411 A1    Jul. 18, 2019

Related U.S. Application Data

(63) Continuation of application No. PCT/CN2017/102805, filed on Sep. 21, 2017.

(30) Foreign Application Priority Data

Sep. 30, 2016 (CN) .......................... 201610878498.0

(51) Int. Cl.
*H04W 56/00* (2009.01)
*H04L 7/08* (2006.01)
(Continued)

(52) U.S. Cl.
CPC ............ *H04L 7/08* (2013.01); *H04L 27/2656* (2013.01); *H04W 56/0035* (2013.01);
(Continued)

(58) Field of Classification Search
None
See application file for complete search history.

(56) References Cited

U.S. PATENT DOCUMENTS

2015/0230268 A1    8/2015 Chen et al.
2015/0319796 A1    11/2015 Lu et al.
(Continued)

FOREIGN PATENT DOCUMENTS

CN    102148784 A    8/2011
CN    104938004 A    9/2015
(Continued)

OTHER PUBLICATIONS

International Search Report, dated Dec. 14, 2017, in International Application No. PCT/CN2017/102805 (4 pp.).
(Continued)

*Primary Examiner* — Jenkey Van
(74) *Attorney, Agent, or Firm* — Leydig, Voit & Mayer, Ltd.

(57) ABSTRACT

The present invention relates to the field of wireless communications, and in particular, to an information sending and receiving method, a base station, and a terminal device that are used for uplink timing of a terminal device. In the information sending method, a first base station determines a first time adjustment parameter and a second time adjustment parameter; the first base station sends the first time adjustment parameter and the second time adjustment parameter to a terminal device. According to the solution provided in this application, the base station provides a plurality of time adjustment parameters for the terminal device to perform uplink signal timing, so as to provide flexible and efficient uplink subframe scheduling for the base station, thereby meeting various requirements for uplink timing.

18 Claims, 8 Drawing Sheets

(51) Int. Cl.
*H04W 72/12* (2009.01)
*H04L 27/26* (2006.01)
*H04W 72/04* (2009.01)

(52) U.S. Cl.
CPC ... *H04W 56/0045* (2013.01); *H04W 72/0446* (2013.01); *H04W 72/12* (2013.01); *H04W 72/1268* (2013.01)

(56) References Cited

U.S. PATENT DOCUMENTS

| | | | |
|---|---|---|---|
| 2015/0358115 A1 | 12/2015 | Wang et al. | |
| 2016/0073367 A1* | 3/2016 | Li | H04W 56/001 370/350 |
| 2016/0219560 A1 | 7/2016 | Chen et al. | |
| 2017/0223714 A1 | 8/2017 | Chen et al. | |
| 2018/0020472 A1* | 1/2018 | Lin | H04W 36/08 |
| 2018/0084546 A1* | 3/2018 | Guo | H04W 56/0015 |
| 2018/0242317 A1* | 8/2018 | Marinier | H04W 56/003 |

FOREIGN PATENT DOCUMENTS

| | | |
|---|---|---|
| CN | 105027648 A | 11/2015 |
| CN | 105592555 A | 5/2016 |
| CN | 105813141 A | 7/2016 |
| EP | 2824979 A1 | 1/2015 |
| EP | 3297343 A2 | 3/2018 |
| WO | 2015010332 A1 | 1/2015 |

OTHER PUBLICATIONS

EP/17854757, Office Action, dated Jul. 22, 2020.
CN/201610878498, Search Report, dated Jul. 1, 2020.
"Discussion on the UL SFN or subframe offset." 3GPP TSG-RAN WG2 meeting #91bis, Malmo, Sweden, R2-154166, pp. 1-3, 3rd Generation Partnership Project, Valbonne, France (Oct. 5-9, 2015).

* cited by examiner

COMMUNICATION METHOD, BASE STATION, AND TERMINAL DEVICE

CROSS-REFERENCE TO RELATED APPLICATIONS

This application is a continuation of International Application No. PCT/CN2017/102805, filed on Sep. 21, 2017, which claims priority to Chinese Patent Application No. 201610878498.0, filed on Sep. 30, 2016. The disclosures of the aforementioned applications are hereby incorporated by reference in their entireties.

TECHNICAL FIELD

The present invention relates to the field of wireless communications, and in particular, to a technology used for uplink timing of a terminal device.

BACKGROUND

A Long Term Evolution (LTE) or Long Term Evolution Advanced (LTE-A) communications system includes downlink transmission and uplink transmission. Downlink transmission means that a base station transmits information to a terminal device, and uplink transmission means that the terminal device transmits information to the base station. A frequency division duplex (FDD) mode and a time division duplex (TDD) mode are mainly used in the LTE or LTE-A communications system. For a wireless communications system operating in the TDD mode, in a period of time, an entire frequency band can be used only for downlink transmission, or an entire frequency band can be used only for uplink transmission. In addition, for an area covered by a same frequency band, for all cells in the area, all transmission needs to be downlink transmission within time of a downlink frequency band, or all transmission needs to be uplink transmission within time of an uplink frequency band.

Due to uneven location distribution of terminal devices in the system, communication services used by the terminal devices are quite different, and a downlink service volume and an uplink service volume of cells covered by a same frequency band at a same moment vary greatly. Therefore, all the cells covered by the same frequency band use same uplink transmission configuration and downlink transmission configuration. Consequently, service requirements of the cells cannot be met efficiently. A flexible duplex technology can be used to separately configure uplink transmission and downlink transmission of each cell, so as to effectively improve utilization of network transmission resources. For example, based on a proportion of an uplink service to a downlink service of a current cell, a configuration of uplink transmission and downlink transmission of the cell in a relatively long time period may be determined, or transmission in each transmission time interval (TTI) is dynamically scheduled.

With wide application of the flexible duplex, within a same TTI and a same frequency band, a serving cell and a neighboring cell may simultaneously perform uplink or downlink transmission, or each cell may separately perform uplink and downlink transmission configuration. Due to uneven location distribution of the terminal devices and independent transmission configuration of the serving cell and the neighboring cell, types of signals received by a base station of the serving cell increase, for example, an uplink signal of a served terminal device, a downlink signal of a base station in the neighboring cell, and even an uplink signal of a served terminal device in the neighboring cell. The base station of the serving cell has more scheduling requirements for uplink transmission of the terminal device, and the existing time sequence alignment cannot meet a service requirement of the base station of the serving cell.

Therefore, a new uplink subframe scheduling method needs to be provided, so as to provide flexible and efficient uplink subframe scheduling for the base station of the serving cell, thereby meeting various requirements for uplink timing.

SUMMARY

The present invention provides a communication method, a base station, and a terminal device, so that the base station can instruct the terminal device to perform uplink subframe scheduling, to meet various requirements for uplink timing.

A communication method includes:

determining, by a first base station, a first time adjustment parameter and a second time adjustment parameter;

sending, by the first base station, the first time adjustment parameter and the second time adjustment parameter to a terminal device, where the first time adjustment parameter and the second time adjustment parameter are used to instruct a first timing advance and a second timing advance for the terminal device sending an uplink signal to the first base station; and sending, by the first base station, first indication information to the terminal device, where the first indication information is used to instruct the terminal device to use one of the first timing advance and the second timing advance.

A communication method includes:

receiving, by a terminal device, a first time adjustment parameter and a second time adjustment parameter from a first base station, where the first time adjustment parameter and the second time adjustment parameter are used to instruct a first timing advance and a second timing advance for the terminal device sending an uplink signal to the first base station;

receiving, by the terminal device, first indication information from the first base station, where the first indication information is used to indicate one of the first timing advance and the second timing advance;

determining, by the terminal device, one of the first timing advance and the second timing advance based on the first indication information; and transmitting, by the terminal device, the uplink signal by using the determined timing advance.

A first base station includes:

a processing unit, configured to determine a first time adjustment parameter and a second time adjustment parameter; and a sending unit, configured to send the first time adjustment parameter and the second time adjustment parameter to a terminal device, where the first time adjustment parameter and the second time adjustment parameter are used to instruct a first timing advance and a second timing advance for the terminal device sending an uplink signal to the first base station; wherein the sending unit is further configured to send first indication information to the terminal device, where the first indication information is used to instruct the terminal device to use one of the first timing advance and the second timing advance.

A terminal device includes:

a receiving unit, configured to receive a first time adjustment parameter and a second time adjustment parameter from a first base station, where the first time adjustment parameter and the second time adjustment parameter are used to instruct a first timing advance and a second timing advance for the terminal device sending an uplink signal to the first base station, the receiving unit is further configured to receive first indication information from the first base station, and the first indication information is used to indicate one of the first timing advance and the second timing advance;

a processing unit, configured to determine one of the first timing advance and the second timing advance based on the first indication information; and a sending unit, configured to transmit the uplink signal by using the determined timing advance.

According to a first aspect, an information sending method is provided, including:

determining, by a first base station, a first time adjustment parameter and a second time adjustment parameter;

sending, by the first base station, the first time adjustment parameter and the second time adjustment parameter to a terminal device, where the first time adjustment parameter and the second time adjustment parameter are separately used by the terminal device to determine to send a timing advance of an uplink signal to the first base station; and sending, by the first base station, first indication information to the terminal device, where the first indication information indicates one of the first time adjustment parameter and the second time adjustment parameter.

By using the foregoing method, the first base station may perform, based on various timing requirements, timing on the uplink signal of the terminal device served by the first base station, thereby implementing flexible and efficient uplink subframe scheduling.

Optionally, the determining, by a first base station, a first time adjustment parameter includes:

determining, by the first base station, the first time adjustment parameter based on arrival time of an interference signal, where the interference signal is a downlink signal sent by an interfering base station, and the interfering base station and the first base station use a same frequency band.

The first time adjustment parameter is determined by using the arrival time of the interference signal, so that the first base station can perform timing advance on the uplink signal of the terminal device based on existence of the interference signal, thereby meeting a processing requirement for the interference signal.

Further, optionally, the first time adjustment parameter is used by the terminal device to adjust starting time of a first time period, so that arrival time of the uplink signal sent in the first time period to the first base station is aligned with the arrival time of the interference signal to the first base station in terms of a time domain symbol.

The first time period is duration in which the terminal device sends the uplink signal to the first base station.

Setting of the first time adjustment parameter may enable the arrival time of the interference signal to the first base station to be aligned with the arrival time of the uplink signal to the first base station in terms of a time domain symbol, so that the first base station deletes the interference signal and separates a wanted signal, thereby improving transmission efficiency.

Optionally, the first base station determines a length of the first time period; and the first base station sends second indication information to the terminal device, where the second indication information is used to indicate a subframe format, and the subframe format includes at least one of a time domain symbol quantity, a symbol starting location, or a symbol ending location.

The subframe format ensures that the first time period does not overlap with a next subframe of a first subframe in which the first time period is located, or ensures that the first time period does not overlap with a part except a cyclic prefix part of a next subframe of a first subframe in which the first time period is located.

Further, optionally, the subframe format indicated by the second indication information is a subframe format of the first time period and/or a subframe format of a next subframe of the first time period.

Optionally, the determining, by a first base station, a second time adjustment parameter includes:

determining, by the first base station, the second time adjustment parameter based on receiving time of the uplink signal.

The second time adjustment parameter is used to adjust the starting time of the first time period as follows: arrival time that is to the first base station and that is corresponding to the first time period is aligned with the receiving time of the uplink signal of the first base station in terms of a time domain symbol.

The first time period is duration in which the terminal device sends the uplink signal to the first base station.

Optionally, the sending, by the first base station, the first time adjustment parameter and the second time adjustment parameter to a terminal device includes:

sending, by the first base station, the first time adjustment parameter and the second time adjustment parameter to the terminal device in a semi-static mode.

According to a second aspect, an information receiving method is provided, including:

receiving, by a terminal device, a first time adjustment parameter and a second time adjustment parameter from a first base station, where the first time adjustment parameter and the second time adjustment parameter are separately used by the terminal device to determine to send timing of an uplink signal to the first base station;

receiving, by the terminal device, first indication information from the first base station, where the first indication information indicates one of the first time adjustment parameter and the second time adjustment parameter; and determining, by the terminal device, starting time for sending the uplink signal based on the first indication information, to send the uplink signal to the first base station.

Optionally, the determining, by the terminal device, starting time for sending the uplink signal based on the first indication information, to send the uplink signal to the first base station includes:

the first indication information indicates the first time adjustment parameter; and the terminal device determines the starting time for sending the uplink signal based on the first time adjustment parameter, so that arrival time of the uplink signal to the first base station is aligned with arrival time of an interference signal to the first base station in terms of a time domain symbol, where the interference signal is a downlink signal sent by an interfering base station, and the interfering base station and the first base station use a same frequency band.

Optionally, the terminal device receives second indication information from the first base station. The second indication information is used to indicate a subframe format. The subframe format includes at least one of a time domain symbol quantity, a symbol starting location, or a symbol ending location. The subframe format ensures that the uplink signal does not overlap with a next subframe of a first subframe in which the uplink signal is located, or ensures that the uplink signal does not overlap with a part except a cyclic prefix part of a next subframe of the first subframe in which the uplink signal is located.

Further, optionally, the subframe format indicated by the second indication information is a subframe format of the uplink signal and/or a subframe format of a next subframe of a subframe in which the uplink signal is located.

In this case, the sending, by the terminal device, the uplink signal to the first base station further includes:

sending, to the first base station by the terminal device based on the subframe format, a subframe in which the uplink signal is located, or a next subframe of the subframe in which the uplink signal is located.

Optionally, the determining, by the terminal device, starting time for sending the uplink signal based on the first indication information, to send the uplink signal to the first base station includes:

the first indication information indicates the second time adjustment parameter; and the terminal device determines the starting time for sending the uplink signal based on the second time adjustment parameter, so that arrival time of the uplink signal to the first base station is aligned with receiving time of the uplink signal of the first base station in terms of a time domain symbol.

According to a third aspect, a first base station is provided, including:

a processing unit, configured to determine a first time adjustment parameter and a second time adjustment parameter; and a sending unit, configured to: send the first time adjustment parameter and the second time adjustment parameter to a terminal device, and send first indication information to the terminal device, where the first indication information indicates one of the first time adjustment parameter and the second time adjustment parameter.

The first time adjustment parameter and the second time adjustment parameter are separately used by the terminal device to determine to send timing of an uplink signal to the first base station.

Optionally, the processing unit is configured to determine the first time adjustment parameter based on arrival time of an interference signal, where the interference signal is a downlink signal sent by an interfering base station, and the interfering base station and the first base station use a same frequency band.

Further, optionally, the first time adjustment parameter is used to adjust starting time of a first time period as follows: arrival time that is to the first base station and that is corresponding to the first time period is aligned with the arrival time of the interference signal to the first base station in terms of a time domain symbol. The first time period is duration in which the terminal device sends the uplink signal to the first base station.

Optionally, the processing unit is further configured to determine a length of the first time period; and the sending unit sends second indication information to the terminal device. The second indication information is used to indicate a subframe format. The subframe format includes at least one of a time domain symbol quantity, a symbol starting location, or a symbol ending location. The subframe format ensures that the first time period does not overlap with a next subframe of a first subframe in which the first time period is located, or ensures that the first time period does not overlap with a part except a cyclic prefix part of a next subframe of the first subframe in which the first time period is located.

Further, optionally, the subframe format indicated by the second indication information is a subframe format of the first time period and/or a subframe format of a next subframe of the first time period.

Optionally, the processing unit is configured to determine the second time adjustment parameter based on receiving time of the uplink signal.

The second time adjustment parameter is used to adjust starting time of the first time period as follows: arrival time that is to the first base station and that is corresponding to the first time period is aligned with the receiving time of the uplink signal of the first base station in terms of a time domain symbol. The first time period is duration in which the terminal device sends the uplink signal to the first base station.

Optionally, the sending unit sends the first time adjustment parameter and the second time adjustment parameter to the terminal device in a semi-static mode.

According to a fourth aspect, a terminal device is provided, where the terminal device includes:

a receiving unit, configured to: receive a first time adjustment parameter and a second time adjustment parameter from a first base station, and receive first indication information from the first base station, where the first indication information indicates one of the first time adjustment parameter and the second time adjustment parameter;

a processing unit, configured to determine starting time for sending an uplink signal based on the first indication information; and a sending unit, configured to send the uplink signal to the first base station based on the starting time for sending the uplink signal.

The first time adjustment parameter and the second time adjustment parameter are separately used by the terminal device to determine to send timing of the uplink signal to the first base station.

Optionally, the first indication information indicates the first time adjustment parameter.

The processing unit determines the starting time for sending the uplink signal based on the first indication information in the following manner:

determining the starting time for sending the uplink signal based on the first time adjustment parameter, so that arrival time of the uplink signal to the first base station is aligned with arrival time of an interference signal to the first base station in terms of a time domain symbol, where the interference signal is a downlink signal sent by an interfering base station, and the interfering base station and the first base station use a same frequency band.

Optionally, the receiving unit is further configured to receive second indication information from the first base station. The second indication information is used to indicate a subframe format. The subframe format includes at least one of a time domain symbol quantity, a symbol starting location, or a symbol ending location. The subframe format ensures that the uplink signal does not overlap with a next subframe of a first subframe in which the uplink signal is located, or ensures that the uplink signal does not overlap with a part except a cyclic prefix part of a next subframe of the first subframe in which the uplink signal is located.

Further, optionally, the subframe format indicated by the second indication information is a subframe format of the uplink signal and/or a subframe format of a next subframe of a subframe in which the uplink signal is located.

The sending unit is configured to send the uplink signal to the first base station in the following manner:

sending, to the first base station based on the subframe format, the uplink signal or a next subframe of the subframe in which the uplink signal is located.

Optionally, the first indication information indicates the second time adjustment parameter.

The processing unit determines the starting time for sending the uplink signal based on the first indication information in the following manner:

determining the starting time for sending the uplink signal based on the second time adjustment parameter, so that arrival time of the uplink signal to the first base station is aligned with receiving time of the uplink signal of the first base station in terms of a time domain symbol.

For the foregoing aspects, the embodiments of the present invention may further include the following optional embodiments.

Optionally, the first indication information includes a notification indicating whether an interference cancellation operation is performed in a period of time. The notification is used to indicate one of the first time adjustment parameter and the second time adjustment parameter.

Optionally, the first time period is an uplink symbol of a first uplink subframe or a first subframe.

Optionally, the first time adjustment parameter is one or more first time adjustment parameters.

Optionally, the first time adjustment parameter is dedicated for the terminal device, or the first time adjustment parameter is shared by terminal devices in a cell of the first base station.

Optionally, in the foregoing base station and terminal device embodiments of the present invention, corresponding functional units may be implemented by corresponding hardware, or may be completed by corresponding hardware by executing corresponding software; for example, the foregoing sending unit may be hardware that has a function of executing the foregoing sending unit, such as a transmitter, or may be a general processor or another hardware device that can execute a corresponding computer program to complete the foregoing functions; for another example, the foregoing processing unit may be hardware that has a function of executing the processing unit, such as a processor, or may be another hardware device that can execute a corresponding computer program to complete the foregoing functions; for still another example, the foregoing receiving unit may be hardware that has a function of executing the foregoing receiving unit, such as a receiver, or may be a general processor or another hardware device that can execute a corresponding computer program to complete the foregoing functions.

The embodiments of the present invention provide an information sending and receiving method, a base station, and a terminal device. A first base station serving as a serving base station configures a plurality of time adjustment parameters for the terminal device, so as to control sending timing of an uplink signal of the terminal device, thereby implementing flexible and efficient uplink subframe scheduling.

DESCRIPTION OF EMBODIMENTS

Figure 1:
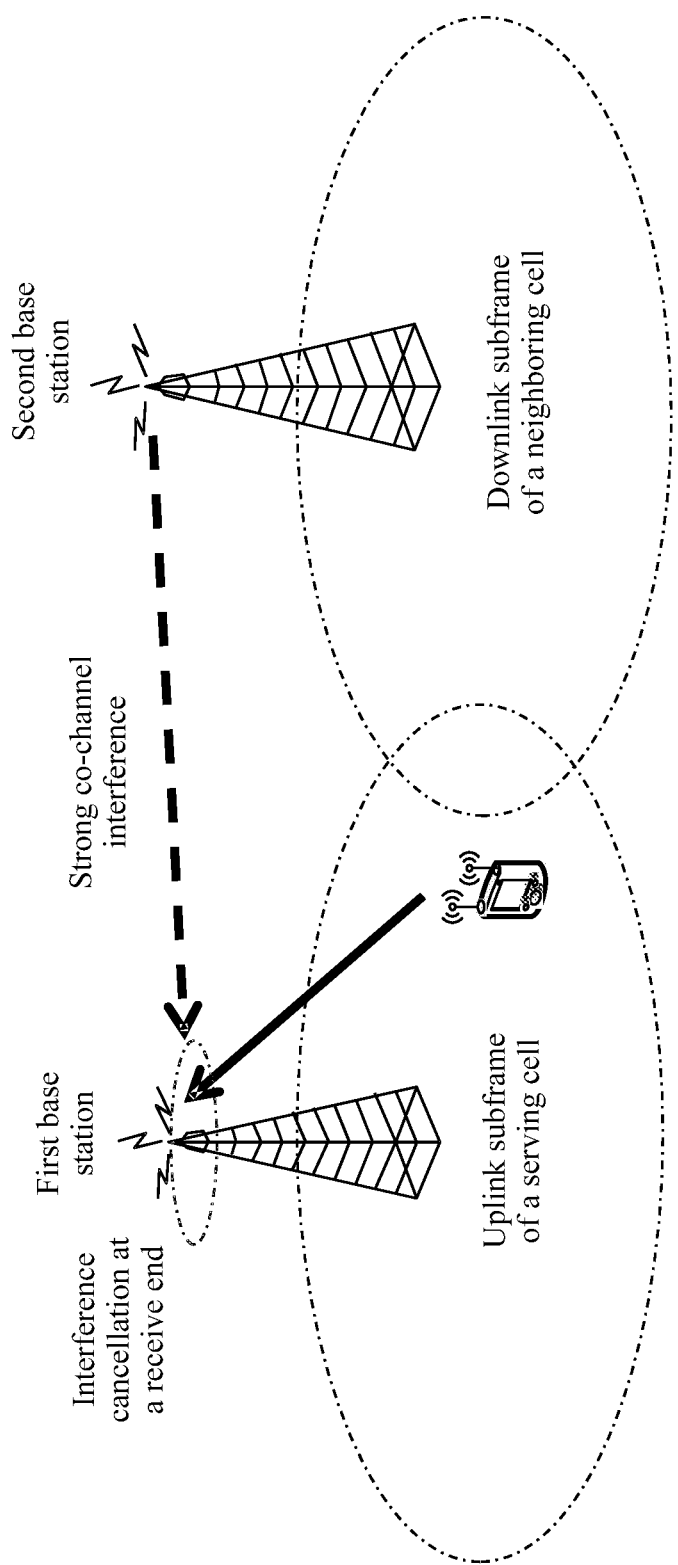
FIG. 1 is a schematic diagram of a wireless communications system according to an embodiment of the present invention.

FIG. 1 is a schematic diagram of an application scenario according to an embodiment of the present invention. A wireless communications system in this embodiment of the present invention is applied to a communications system that works in a flexible duplex mode, or a communications system that works in a dynamic TDD mode. The wireless communications system in this embodiment of the present invention includes a first base station, one or more second base stations, and a terminal device. The terminal device is located in a coverage area of the first base station. The first base station is a serving base station of the terminal device, namely, a base station accessed by the terminal device, and provides a service for the terminal device by using a serving cell. The second base station is a neighboring base station of the first base station. In a same TTI, when uplink transmission is performed in the serving cell, and downlink transmission is performed in one or more cells adjacent to the serving cell, because transmit power of a base station is much greater than transmit power of a terminal device, the base station in the serving cell receives a downlink signal sent by a base station in a neighboring cell while receiving uplink information sent by the terminal device in the serving cell. Consequently, the downlink signal causes strong interference to an uplink signal sent by the terminal device. The second base station is also referred to as an interfering base station.

Figure 2:
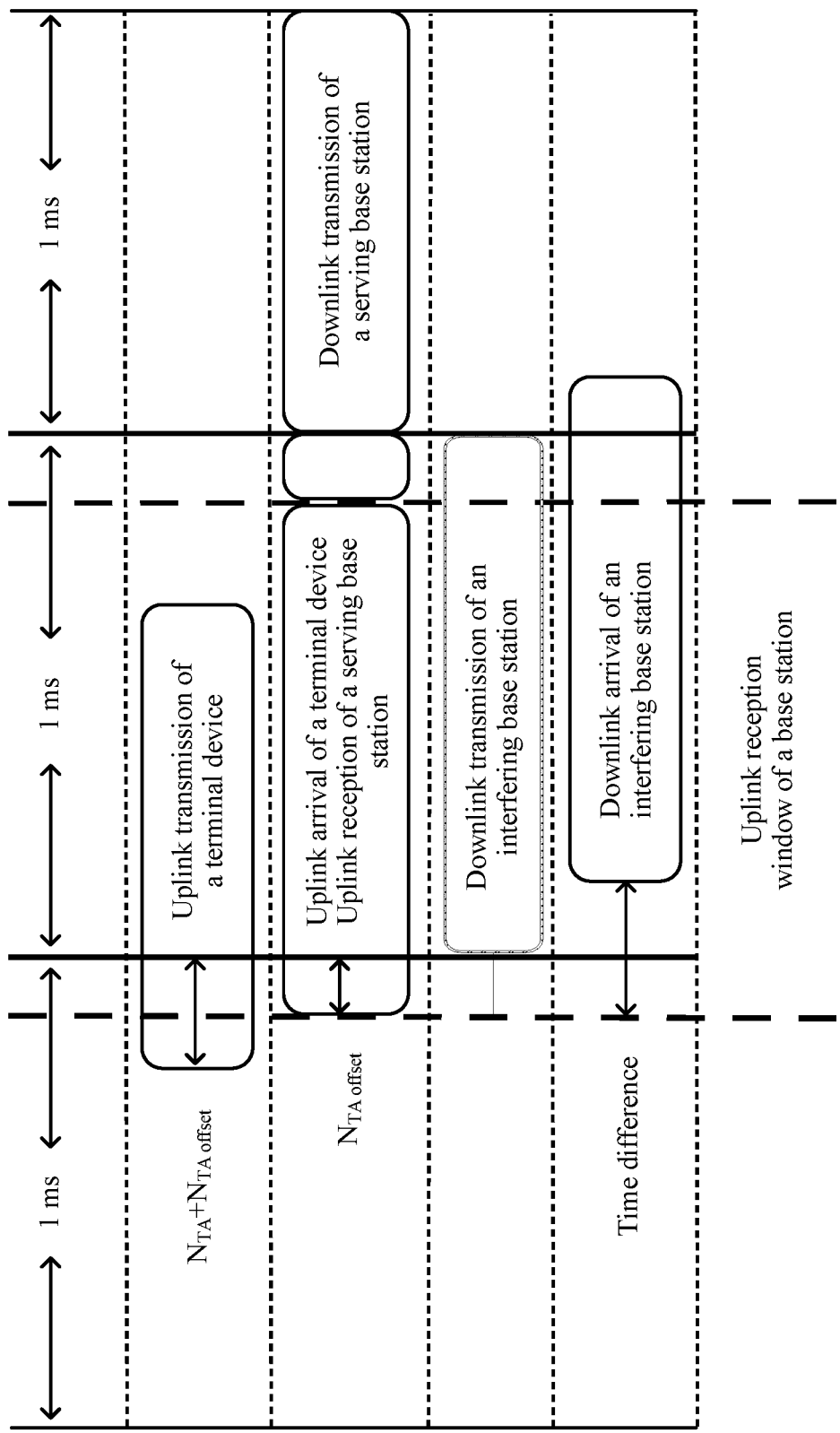
FIG. 2 is a schematic diagram of a time sequence relationship in the prior art.

FIG. 2 is a schematic diagram of a time sequence relationship in the prior art. In FIG. 2, a location indicated by a vertical solid line is a starting location (or an ending location) used by a serving base station and an interfering base station to send a downlink subframe of a downlink signal, and a location indicated by a vertical dashed line is a starting location (or an ending location) used by the serving base station to receive an uplink subframe of an uplink signal sent by a terminal device in a serving cell. It can be learned that a timing advance of the receiving location of the uplink subframe relative to the sending location of the downlink subframe is $N_{TA\ offset}$. The advance $N_{TA\ offset}$ is a statically configured parameter in the prior art, and is used by a base station (including the serving base station and the interfering base station) to determine a time location used to receive an uplink signal carried in an uplink subframe. In the prior art, a terminal device determines a starting location for sending an uplink subframe based on $N_{TA\ offset}$ and a parameter $N_{TA}$ dedicated for the terminal device. The parameter $N_{TA}$ is notified to the terminal device by the serving base station by using semi-static signaling, and is used by the terminal to adjust a location of the uplink subframe. To be specific, in a case in which $N_{TA\ offset}$ is 0, arrival time of the uplink subframe is aligned with sending time of a downlink subframe. In FIG. 2, an arc rectangular frame marked as uplink transmission of a terminal device represents a time domain location used by the terminal device to send an uplink subframe of an uplink signal, an arc rectangular frame marked as uplink arrival of a terminal device represents a time domain location that an uplink signal sent by the terminal device arrives at a serving base station, an arc rectangular frame marked as downlink transmission of an interfering base station represents a time domain location used by a neighboring base station (namely, a second base station) to send a downlink subframe of a downlink signal, and an arc rectangular frame marked as downlink arrival of an interfering base station represents a time domain location that a downlink signal sent by a neighboring base station arrives at a serving base station.

It may be learned from FIG. 2 that $N_{TA\ offset}$ is configured in the prior art, and co-channel transmission of downlink subframes of the serving base station and a neighboring interfering base station is performed. This leads to a plurality of uplink and downlink signals with a time sequence deviation, and the serving base station may have various timing requirements for an uplink subframe of a terminal device served by the serving base station.

According to the information sending and receiving method provided in the embodiments of the present invention, in addition to configuring a time adjustment parameter used for uplink timing in the prior art, the base station may further configure at least one time adjustment parameter, so that the terminal device performs uplink signal sending time adjustment based on different timing requirements of the base station.

The terminal device mentioned in the embodiments of the present invention may be a device that provides a user with voice and/or data connectivity, a handheld device having a wireless connection function, or another processing device connected to a wireless modem. The wireless terminal may communicate with one or more core networks by using a radio access network (for example, RAN). The wireless terminal may be a mobile terminal, such as a mobile phone (or referred to as a "cellular" phone) and a computer with a mobile terminal, for example, may be a portable, pocket-sized, handheld, computer built-in, or in-vehicle mobile apparatus, which exchanges voice and/or data with the radio access network. For example, the wireless terminal may be a device such as a personal communications service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile console, a remote station, an access point, a remote terminal, an access terminal a user terminal, a user agent, a user device, or user equipment.

The base station mentioned in the embodiments of the present invention includes but is not limited to a macro base station, a micro base station, a picocell base station, a pico remote radio unit (pRRU for short), a remote radio head (RRH for short), and the like that belong to a same macro base station, and one or more of the pRRU, the RRH, and the like that belong to different macro base stations. In addition, the base station may be a base station in a Global System for Mobile Communications (GSM for short) or a Code Division Multiple Access (CDMA for short) system, or may be a NodeB (NodeB) in a Wideband Code Division Multiple Access (WCDMA for short) system, or may be an evolved NodeB (eNB or eNodeB for short) in LTE. This is not limited in this application.

The following describes the technical solutions in the embodiments of the present invention with reference to the accompanying drawings. It should be noted that, the embodiments of the present invention and features in the embodiments can be combined with each other as long as no conflicts exist.

An embodiment of the present invention provides a communication method, and the method specifically includes the following steps.

Step 101: A first base station determines a first time adjustment parameter and a second time adjustment parameter.

Step 102: The first base station sends the first time adjustment parameter and the second time adjustment parameter to a terminal device, where the first time adjustment parameter and the second time adjustment parameter are used to instruct a first timing advance and a second timing advance for the terminal device sending an uplink signal to the first base station.

Step 103: The first base station sends first indication information to the terminal device, where the first indication information is used to instruct the terminal device to use one of the first timing advance and the second timing advance.

In the foregoing method, in an optional implementation, the first base station determines the second time adjustment parameter based on a random access preamble signal sent by the terminal device. Optionally, the first base station may further determine the first time adjustment parameter based on arrival time of an interference signal, where the interference signal is a downlink signal sent by an interfering base station, and the interfering base station and the first base station use a same frequency band. The first timing advance is configured to enable a symbol of the uplink signal to be aligned with a symbol of the interference signal.

In another optional implementation, the first indication information is used to instruct the terminal device to use the first timing advance for a first transmission time unit.

Optionally, the first time adjustment parameter is used to indicate an offset, and the offset is an offset of the first timing advance relative to the second timing advance.

In addition, in an optional implementation, the first base station sends second indication information to the terminal device, where the second indication information is used to indicate a quantity of valid symbols in the first transmission time unit or a quantity of valid symbols in a second transmission time unit, and the second transmission time unit is a previous transmission time unit or a next transmission time unit of the first transmission time unit.

Optionally, the quantity of valid symbols in the first transmission time unit is greater than the quantity of valid symbols in the second transmission time unit, or the quantity of valid symbols in the first transmission time unit is less than the quantity of valid symbols in the second transmission time unit.

Optionally, the second transmission time unit is a transmission time unit for transmitting the uplink signal by using the second timing advance, or the second transmission time unit is a transmission time unit for transmitting the downlink signal. When the first timing advance is greater than the second timing advance, the second transmission time unit is the previous transmission time unit of the first transmission time unit; and/or when the first timing advance is less than the second timing advance, the second transmission time unit is a next transmission time unit of the first transmission time unit.

Optionally, a first transmission time period is a time period in which the uplink signal is transmitted by using the first timing advance for the first transmission time unit, and a second transmission time period is a time period in which the uplink signal is transmitted by using the second timing advance for the second transmission time unit, or the second transmission time period is a time period in which the downlink signal is transmitted. The first transmission time period does not overlap with the second transmission time period, or parts except a cyclic prefix do not overlap.

Optionally, the first indication information includes a notification indicating whether an interference cancellation operation is performed in a period of time.

Optionally, the first time adjustment parameter is dedicated for the terminal device, or the first time adjustment parameter is shared by terminal devices in a cell of the first base station.

Optionally, that the first base station sends the first time adjustment parameter and the second time adjustment parameter to the terminal device includes:

the first base station sends the first time adjustment parameter and the second time adjustment parameter to the terminal device in a semi-static mode.

An embodiment of the present invention further provides a communication method, and the method specifically includes the following steps.

A terminal device receives a first time adjustment parameter and a second time adjustment parameter from a first base station, where the first time adjustment parameter and the second time adjustment parameter are used to instruct a first timing advance and a second timing advance for the terminal device sending an uplink signal to the first base station.

The terminal device receives first indication information from the first base station, where the first indication information is used to indicate one of the first timing advance and the second timing advance.

The terminal device determines one of the first timing advance and the second timing advance based on the first indication information.

The terminal device transmits the uplink signal by using the determined timing advance.

In an optional implementation, before the terminal device receives the first time adjustment parameter and the second time adjustment parameter from the first base station, the method further includes: sending, by the terminal device, a random access preamble signal to the first base station, where the random access preamble signal is used to determine the second time adjustment parameter.

Optionally, the first timing advance is configured to enable a symbol of the uplink signal to be aligned with a symbol of the interference signal.

Optionally, the first indication information is used to instruct the terminal device to use the first timing advance for a first transmission time unit.

In the foregoing implementations, optionally, the terminal device receives second indication information from the first base station, where the second indication information is used to indicate a quantity of valid symbols in the first transmission time unit or a quantity of valid symbols in a second transmission time unit, and the second transmission time unit is a previous transmission time unit or a next transmission time unit of the first transmission time unit.

Optionally, the quantity of valid symbols in the first transmission time unit is greater than the quantity of valid symbols in the second transmission time unit, or the quantity of valid symbols in the first transmission time unit is less than the quantity of valid symbols in the second transmission time unit.

Optionally, the second transmission time unit is a transmission time unit for transmitting the uplink signal by using the second timing advance, or the second transmission time unit is a transmission time unit for transmitting the downlink signal. When the first timing advance is greater than the second timing advance, the second transmission time unit is the previous transmission time unit of the first transmission time unit; and/or when the first timing advance is less than the second timing advance, the second transmission time unit is a next transmission time unit of the first transmission time unit.

Optionally, a first transmission time period is a time period in which the uplink signal is transmitted by using the first timing advance for the first transmission time unit, and a second transmission time period is a time period in which the uplink signal is transmitted by using the second timing advance for the second transmission time unit, or the second transmission time period is a time period in which the downlink signal is transmitted. The first transmission time period does not overlap with the second transmission time period, or parts except a cyclic prefix do not overlap.

Optionally, the first time adjustment parameter is used to indicate an offset, and the offset is an offset of the first timing advance relative to the second timing advance.

Optionally, the first indication information includes a notification indicating whether an interference cancellation operation is performed in a period of time.

Optionally, the first time adjustment parameter is dedicated for the terminal device, or the first time adjustment parameter is shared by terminal devices in a cell of the first base station.

Optionally, that the terminal device receives the first time adjustment parameter and the second time adjustment parameter from the first base station includes: the terminal device receives the first time adjustment parameter and the second time adjustment parameter from the first base station in a semi-static mode.

Figure 3:
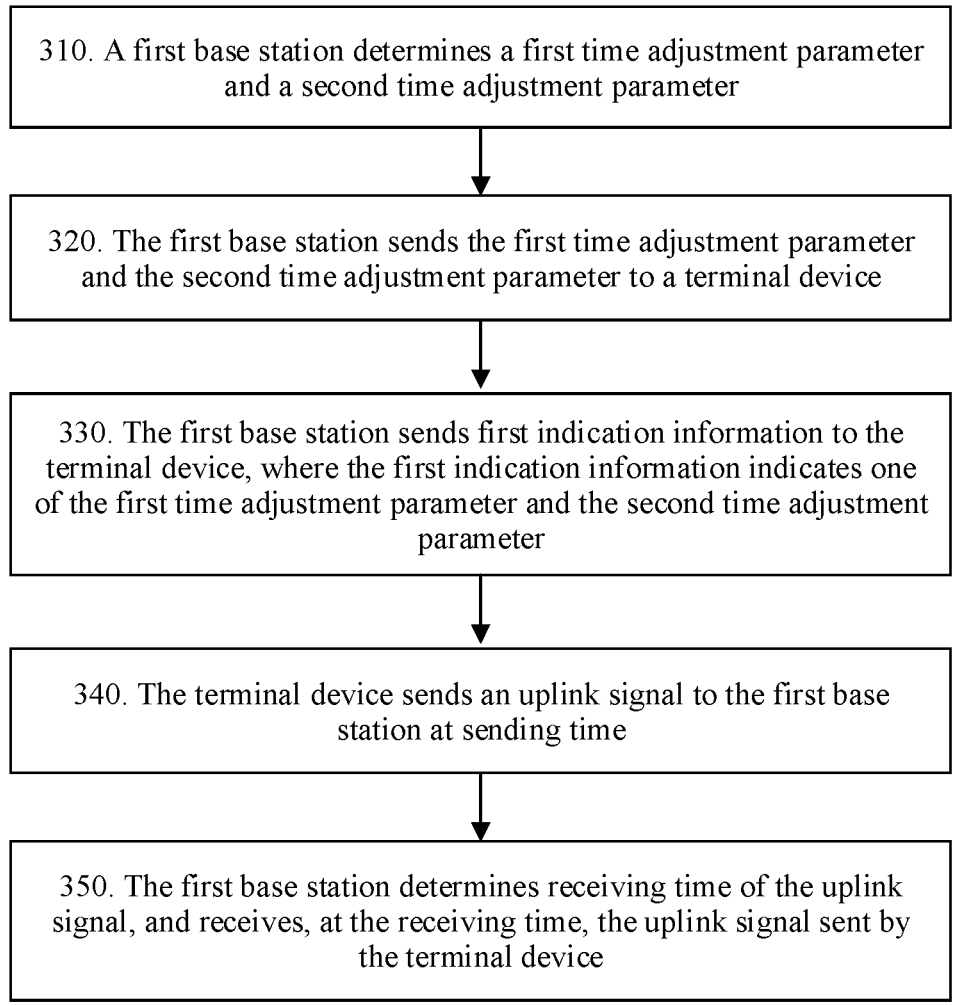
FIG. 3 is a schematic flowchart of an information sending and receiving method according to an embodiment of the present invention.

To further describe the communication method in the foregoing embodiments in detail, an example is used for detailed description below with reference to FIG. 3. FIG. 3 is a schematic flowchart of a communication method according to an implementation of an embodiment of the present invention. The method includes the following steps.

Step 310: A first base station determines a first time adjustment parameter and a second time adjustment parameter.

Specifically, the first base station determines the first and second time adjustment parameters based on a signal transmission delay between the first base station and a terminal device and/or a timing requirement.

Optionally, the first and second time adjustment parameters are different uplink timing advances.

Optionally, the first time adjustment parameter is a timing parameter. The timing parameter is corresponding to a timing requirement, and is used by the terminal device to determine an uplink timing advance.

For example, the timing parameter may be an uplink transceiving delay, a downlink transceiving delay, or another timing-related parameter.

Optionally, the first time adjustment parameter may be one or more first time adjustment parameters.

Specifically, the first base station sets index information for each first time adjustment parameter, and the index information uniquely corresponds to one first time adjustment parameter.

In addition, the first base station may further set index information for the second time adjustment parameter.

Step 320: The first base station sends the first time adjustment parameter and the second time adjustment parameter to a terminal device, where the first time adjustment parameter and the second time adjustment parameter are separately used by the terminal device to determine to send a timing advance of an uplink signal to the first base station.

Optionally, the terminal device determines a first timing advance based on the first time adjustment parameter, and determines a second timing advance based on the second time adjustment parameter.

Further, optionally, the first and second timing advances may be the same or different.

Optionally, the first base station may send the first time adjustment parameter and the second time adjustment parameter to the terminal device by using higher layer signaling.

Further, the first base station may send the first and second time adjustment parameters to the terminal device in a semi-static mode, for example, in a manner of radio resource control (RRC) signaling or Media Access Control (MAC) layer signaling.

Step 330: The first base station sends first indication information to the terminal device, where the first indication information indicates one of the first time adjustment parameter and the second time adjustment parameter.

Based on the first indication information, the terminal device determines sending time of a first uplink subframe based on at least one of the first time adjustment parameter and the second time adjustment parameter.

Specifically, the first indication information may include the index information, and the terminal device determines the first or second time adjustment parameter based on the index information.

Optionally, the terminal device determines the sending time of the first uplink subframe based on the first time adjustment parameter or the second time adjustment parameter.

For example, the terminal device uses the first or second time adjustment parameter as an uplink timing advance.

Optionally, the terminal device determines the sending time of the first uplink subframe based on the first time adjustment parameter and the second time adjustment parameter.

For example, the terminal device obtains the uplink timing advance based on the first and second time adjustment parameters.

It should be noted that, in step 330, the terminal device determines starting time for sending the first uplink subframe based on preset configuration information and the first indication information. The preset configuration information is used to indicate a correspondence among the indication information, the time adjustment parameter, and the timing advance, so that the terminal device may determine, based on the configuration information, starting time for sending the uplink signal after receiving the first indication information.

The preset configuration information may be notified by the base station to the terminal device when the terminal device accesses the base station, for example, notified in a signaling manner, or preconfigured for the terminal device.

Step 340: The terminal device sends the uplink signal to the first base station at sending time.

Step 350: The first base station determines receiving time of the uplink signal, and receives, at the receiving time, the uplink signal sent by the terminal device.

This embodiment of the present invention provides an information sending and receiving method. According to the method, the first base station may preconfigure a plurality of time adjustment parameters, and notify, based on different timing requirements, the terminal device to perform corresponding uplink signal timing, so as to provide a flexible and efficient uplink subframe scheduling manner for a base station in a serving cell, thereby meeting various requirements for uplink timing.

Further, as shown in FIG. 2, a time window for uplink reception of a serving base station is compared with a time window for downlink transmission of an interfering base station, and an advance is $N_{TA\_offset}$. To make time at which the uplink signal arrives at the serving base station be fully aligned with time of an uplink reception window of the serving base station, a time point of uplink transmission of the terminal device needs to be advanced, and the advance is expressed as $N_{TA}+N_{TA\_offset}$. In a case in which the serving base station and the interfering base station use a same frequency band, the time window for downlink transmission of the interfering base station is fully aligned with a time window for downlink transmission of the serving base station. Therefore, when the terminal device sends the uplink signal to the serving base station by using a first frequency band and the interfering base station sends the downlink signal by using the same first frequency band, the serving base station receives the downlink signal sent by the interfering base station while receiving the uplink signal sent by the terminal device. In this case, the serving base station needs to delete, from the received signals, signals from the neighboring base station, and restores the uplink signal sent by the terminal device. In this optional embodiment of the present invention, an operation that the serving base station deletes, from the received signals, signals from the neighboring base station is referred to as an interference cancellation operation, and the signals that are in the signals received by the serving base station and that are from the neighboring base station are referred to as interference signals, and signals that are in the signals received by the serving base station and that are from the terminal device are referred to as wanted signals.

In an optional embodiment, in step 310, the first base station determines the first time adjustment parameter based on arrival time of the interference signal. The interference signal is a downlink signal sent by a second base station (the interfering base station) that uses a same frequency band as the first base station.

In this optional embodiment, the first base station may perform timing adjustment on the uplink signal of the terminal device based on the received interference signal.

The first base station determines, by measuring the arrival time of the interference signal, that a difference between time at which the downlink signal sent by the interfering base station arrives at the first base station and time at which the second base station sends the downlink signal is $N_{Delay}$.

Optionally, the first base station determines that the first time adjustment parameter is $N_{TA\text{-}IC}=N_{TA}-N_{Delay}$ based on timing advance parameters $N_{TA}$ and $N_{Delay}$ in the prior art.

Optionally, the first base station may also determine that the first time adjustment parameter is:

$$N_{TA\text{-}IC}=N_{Delay}.$$

The first time adjustment parameter is used to determine starting time of the first uplink subframe. The first time adjustment parameter adjusts the starting time of the first uplink subframe as follows: arrival time of the first uplink subframe to the first base station is aligned with the arrival time of the interference signal to the first base station in terms of a time domain symbol. In this way, the first base station may delete, from the received signals, interference signals from the interfering base station, and restore the uplink signal sent by the terminal device.

Optionally, the first time adjustment parameter may be a parameter dedicated for the terminal device. To be specific, an independent parameter is separately configured for each terminal device of a first cell of the first base station. The first time adjustment parameters received by at least two terminal devices may be the same, but the serving base station separately configures the first time adjustment parameter for the at least two terminal devices.

Optionally, the first parameter may also be a cell-specific parameter. The cell-specific parameter means that terminal devices located in the first cell of the first base station share a same first time adjustment parameter.

Optionally, the first base station determines the timing advance parameter $N_{TA}$ in the prior art as the second time adjustment parameter.

When the parameter $N_{TA}$ changes, for example, the first base station determines that the $N_{TA}$ changes, the first base station sends a new $N_{TA}$ to the terminal device. Index information of the new $N_{TA}$ is the same as index information of the original $N_{TA}$. The terminal device updates a corresponding $N_{TA}$ value based on the index information.

Optionally, in step 330, the first indication information indicates either of the first or second time adjustment parameter.

For example, if the first indication information indicates the first time adjustment parameter, the terminal device determines the sending time of the first uplink subframe based on $N_{TA\text{-}IC}$.

When the first time adjustment parameter determined by the first base station is $N_{TA\text{-}IC}=N_{TA}-N_{Delay}$, the terminal device determines that a sending timing advance of the first uplink subframe is $(N_{TA\text{-}IC}+N_{TA\ offset})$ based on the parameter $N_{TA\ offset}$ in the prior art and the parameter $N_{TA\text{-}IC}$.

When the first time adjustment parameter determined by the first base station is $N_{TA\text{-}IC}=N_{Delay}$, the terminal device determines that the sending timing advance of the first uplink subframe is $(N_{TA}-N_{TA\text{-}IC}+N_{TA\ offset})$ based on the parameters $N_{TA\ offset}$ and $N_{TA}$ in the prior art and the parameter $N_{TA\text{-}IC}$.

For another example, if the first indication information indicates the second time adjustment parameter, the terminal device determines the sending time of the uplink subframe based on the second time adjustment parameter, such as the parameter $N_{TA}$ in the prior art.

Further, optionally, before step 310, this embodiment of the present invention may further include:

the first base station determines at least one interfering base station, where each interfering base station corresponds to one first time adjustment parameter.

Specifically, the first base station determines a first time adjustment parameter corresponding to each interfering base station based on a distance between the first base station and each interfering base station. The first time adjustment parameter is used to adjust the starting time of the first uplink subframe as follows: the arrival time of the first uplink subframe to the first base station is aligned with the arrival time of the interference signal of the interfering base station corresponding to the first time adjustment parameter to the first base station in terms of a time domain symbol.

Further, in step 320, the first base station sends the at least one first time adjustment parameter and the second time adjustment parameter to the terminal device.

Further, before step 330, this embodiment of the present invention further includes:

the first base station receives an interference signal to generate first indication information, where the first indication information indicates a first time adjustment parameter corresponding to an interfering base station from which the interference signal comes.

In this embodiment of the present invention, the serving base station configures a newly defined time sequence parameter, and configures a new sending time sequence for the terminal device, so that time at which the uplink signal sent by the terminal device arrives at the serving base station is aligned with time at which the downlink signal sent by the interfering base station arrives at the serving base station in terms of a time domain symbol. In this case, the serving base station can delete, from the received signals, the downlink signals from the interfering base station, so that the uplink signal sent by the terminal device can be restored in a case in which uplink transmit power of the terminal is relatively low, and power overheads of the terminal device are reduced, thereby improving network energy efficiency.

Further, optionally, the first indication information in step 330 may further indicate that the interference cancellation operation needs to be performed in a first subframe or in a period of time.

In a possible implementation, the first base station dynamically sends indication information to the terminal device, to indicate whether the interference cancellation operation is performed in the first subframe. The first subframe may be a specific subframe. For example, the indication information may be a field that is in a physical downlink control channel (PDCCH) and that is used to schedule the first subframe. Certainly, the indication information may also be a field that is in the PDCCH and that is used to schedule another subframe. When the indication information indicates that the interference cancellation operation is performed in the first subframe, the terminal device determines the starting time of the first subframe in step 330 based on the first time adjustment parameter. When the indication information indicates that the interference cancellation operation is not performed in the first subframe, the terminal device determines the starting time of the first subframe based on the second time adjustment parameter, for example, the parameter $N_{TA}$ in the prior art.

The indication information may be one bit, for example, setting is shown in Table 1.

TABLE 1

| Signaling value | Meaning |
| --- | --- |
| 0 | Interference cancellation is not performed in the first subframe. |
| 1 | Interference cancellation is performed in the first subframe. |

In another possible implementation, there are one or more first time adjustment parameters. The first base station dynamically sends the indication information to the terminal device, to indicate whether the interference cancellation operation is performed in the first subframe. When the indication information indicates that the interference cancellation operation is performed in the first subframe, the indication information further indicates a first time adjustment parameter used to determine uplink transmission timing.

Specifically, the indication information includes index information, and the index information is used to indicate one first time adjustment parameter $N_{TA-IC}$. The index information is preset by the first base station based on a neighboring interfering base station. A rule for setting the index information may be determined by the first base station, so that first time adjustment parameters corresponding to different interfering base stations are distinguished. A specific setting rule is not limited herein.

The indication information may be two bits, for example, when the first base station has a first interfering base station, a second interfering base station, and a third interfering base station, setting is shown in Table 2.

TABLE 2

| Signaling value | Meaning |
| --- | --- |
| 00 | Interference cancellation is not performed in the first subframe. |
| 01 | Interference cancellation is performed in the first subframe and a first time adjustment parameter (corresponding to the first interfering base station) is used. |
| 10 | Interference cancellation is performed in the first subframe and a first time adjustment parameter (corresponding to the second interfering base station) is used. |
| 11 | Interference cancellation is performed in the first subframe and a first time adjustment parameter (corresponding to the third interfering base station) is used. |

It should be noted that there may be a plurality of neighboring interfering base stations of the first base station. In an interference cancellation operation scenario, a maximum quantity of interfering base stations that can be configured by the first base station is N (N is a positive integer). In this case, the first base station may select M (M<N, M is a positive integer) interfering base stations in the neighboring interfering base stations as interfering base stations in the interference cancellation scenario. A selection manner may be determined by the base station based on an actual communication requirement. This is not specifically limited herein.

It should be noted that, whether the first indication information includes the following: the interference cancellation operation needs to be performed in the first subframe or in a period of time may be selectively set based on a signaling design requirement. The first indication information may indicate only one first time adjustment parameter or one second time adjustment parameter. In this case, the terminal device performs uplink transmission timing based on the first or second time adjustment parameter.

In another possible implementation, the first base station semi-statically sends the first indication information to the terminal device, to indicate that the interference cancellation operation is performed in a period of time. After receiving the indication information, the terminal device determines, within time indicated by the indication information, the sending time of the uplink subframe based on the first time adjustment parameter indicated by the indication information.

Figure 4:
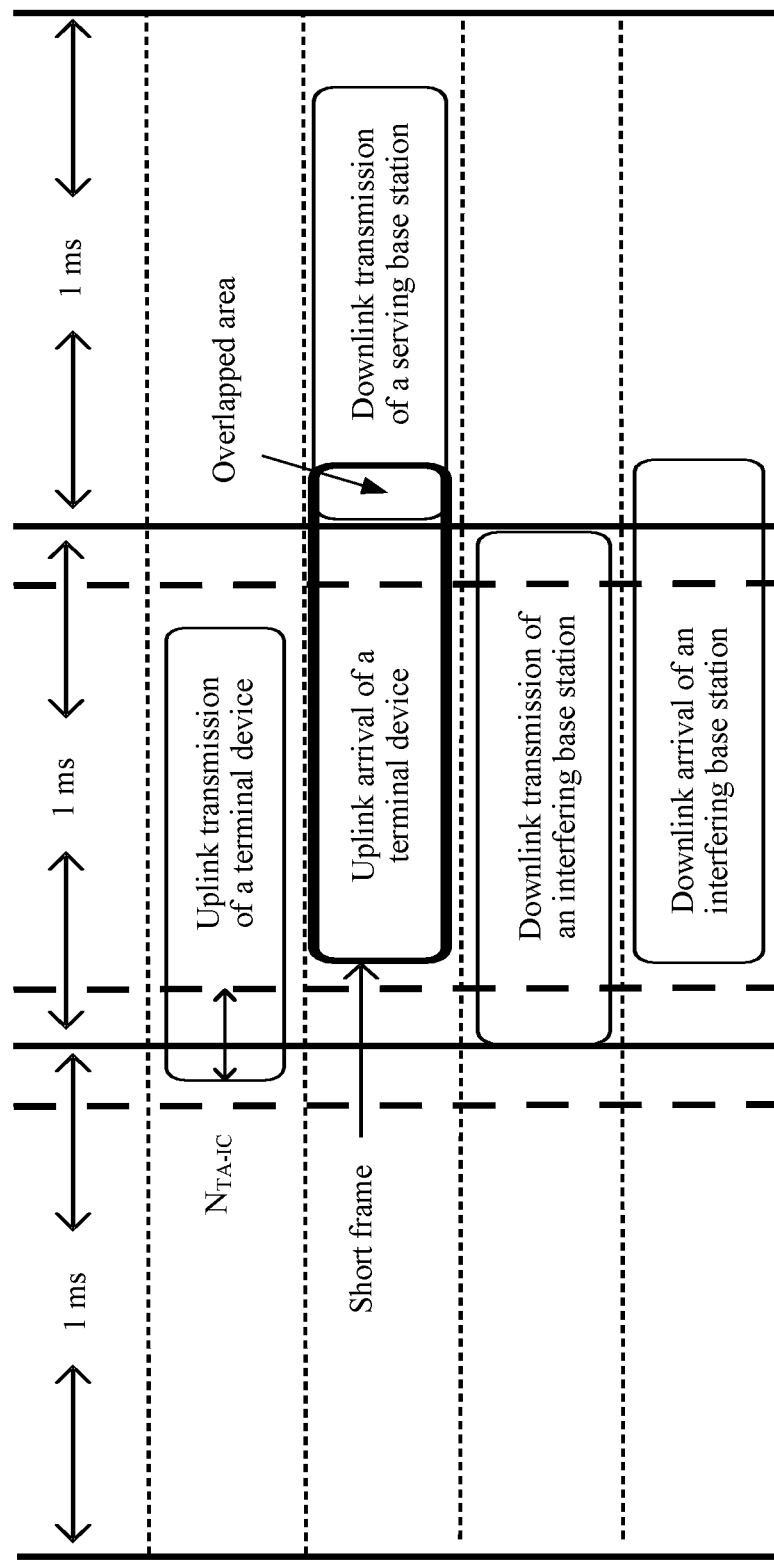
FIG. 4 is a schematic diagram of a time sequence relationship before adjustment of a subframe structure according to an embodiment of the present invention.
Figure 5:
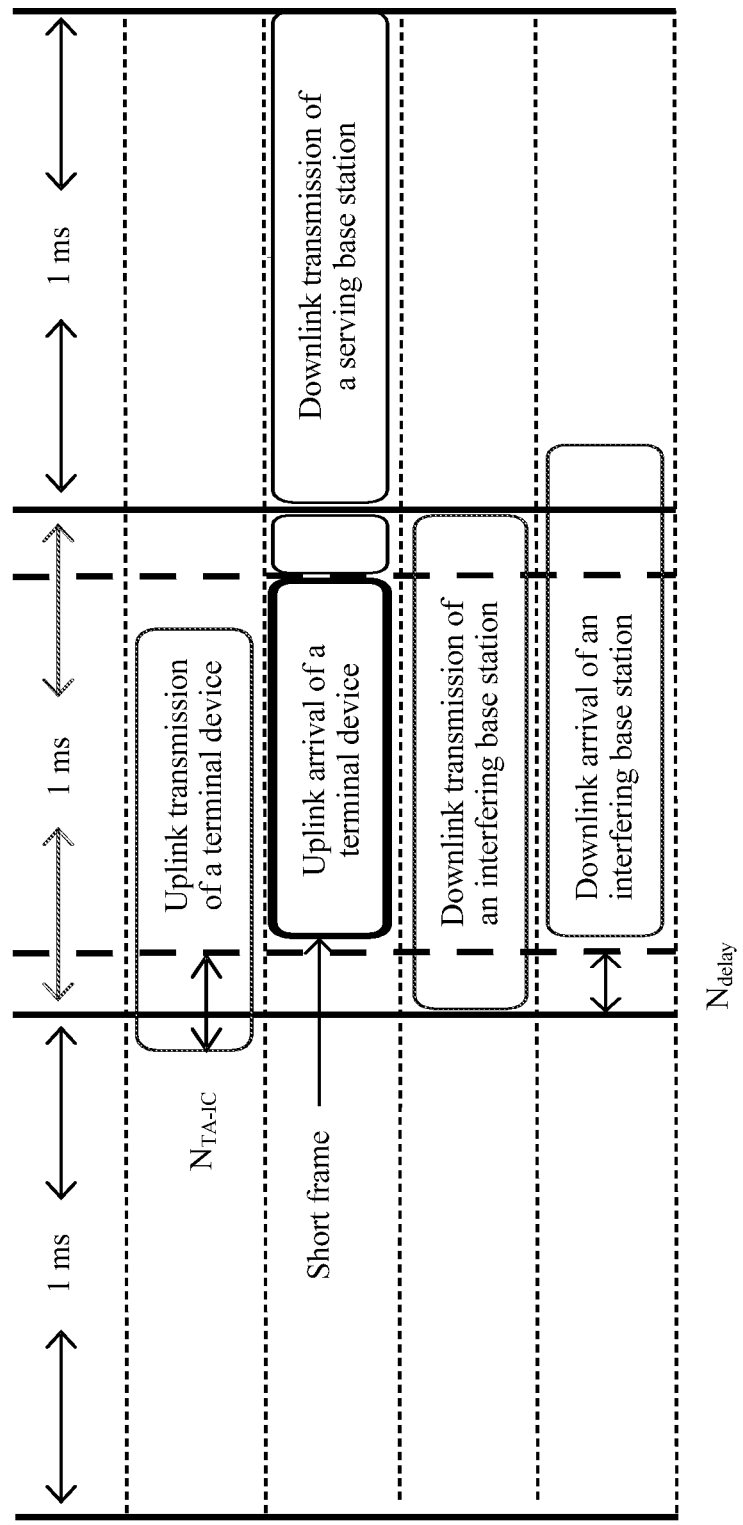
FIG. 5 is a schematic diagram of a time sequence relationship 1 using a short frame structure according to an embodiment of the present invention.
Figure 6:
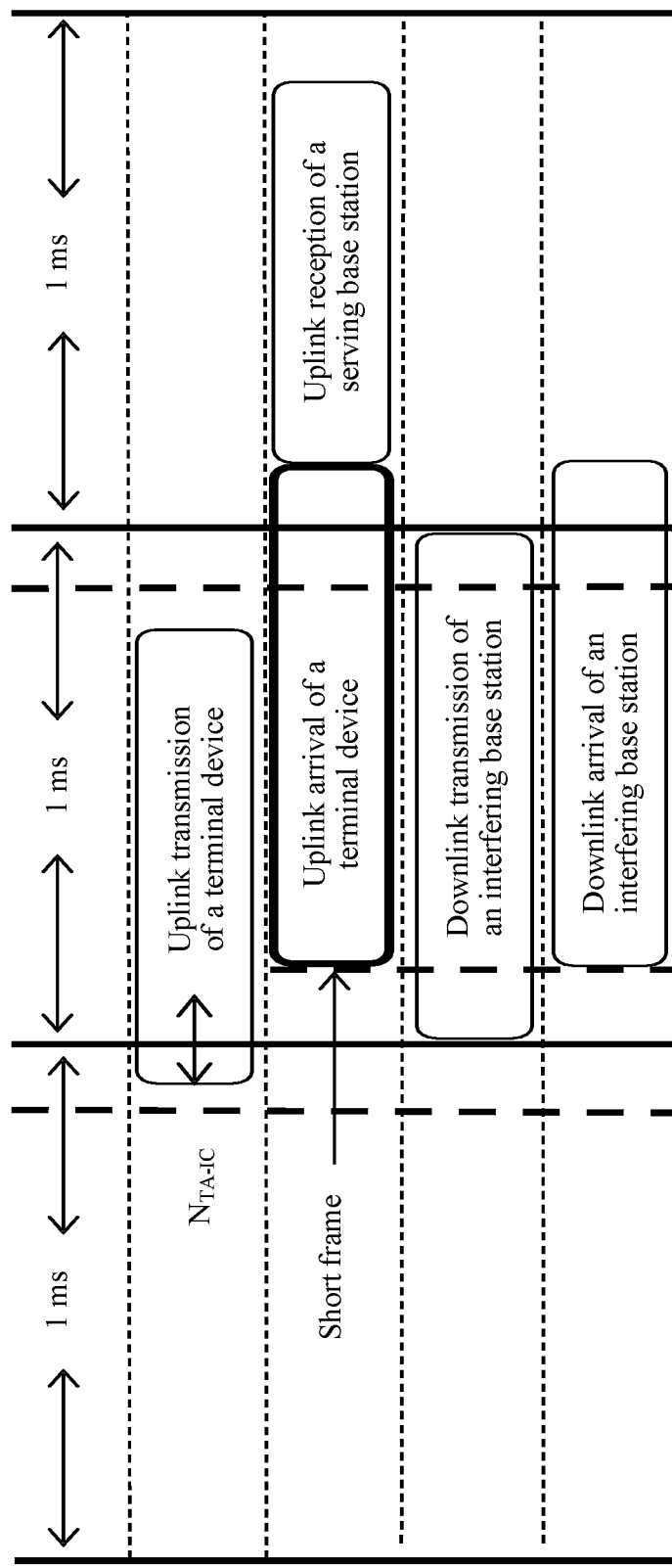
FIG. 6 is a schematic diagram of a time sequence relationship 2 using a short frame structure according to an embodiment of the present invention.
Figure 7:
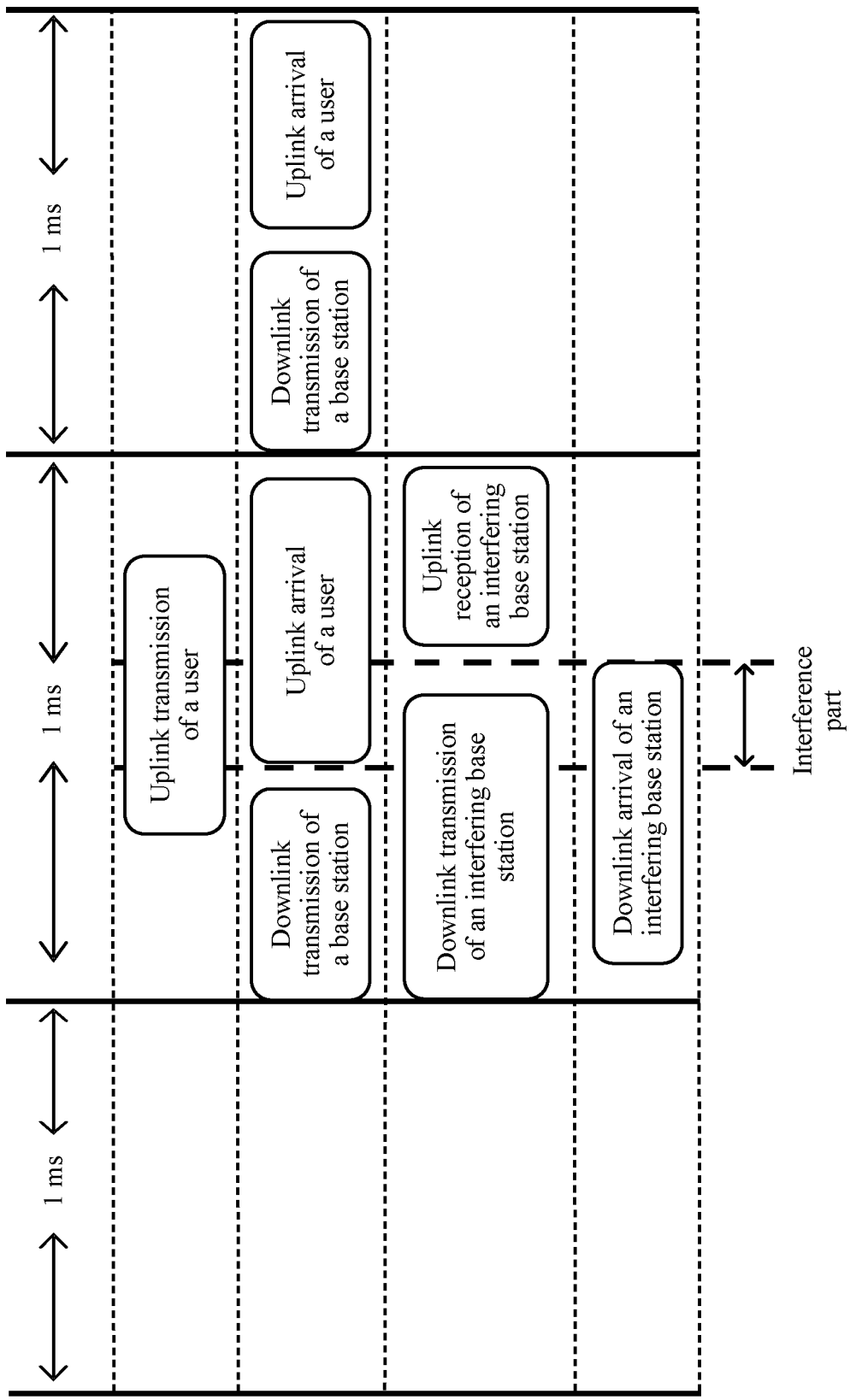
FIG. 7 is a schematic diagram of a time sequence relationship in a case of a self-contained subframe according to an embodiment of the present invention.

Further, if only uplink transmission time of a user terminal is adjusted instead of improving a subframe format, an uplink subframe in which interference cancellation is performed may overlap with a next downlink subframe. This affects normal sending of the next subframe. As shown in FIG. 4, when a first uplink subframe (namely, a subframe marked as uplink arrival of a terminal device) is still an uplink subframe with 1 ms, a right boundary of an arc rectangular frame marked as uplink arrival of a terminal device crosses to a right side of a vertical dashed line on a right side, so as to partially overlap with an arc rectangular frame marked as downlink transmission of a serving base station. In this case, downlink transmission of the serving base station is affected. To resolve this problem, a short subframe format is designed in this embodiment of the present invention, as shown in FIG. 5, FIG. 6, and FIG. 7. In this way, overlapping between an uplink subframe in which interference cancellation is performed and a next downlink subframe can be avoided. A first uplink subframe uses a short frame in FIG. 5, a next subframe of a first uplink subframe uses a short frame in FIG. 6, as shown in an arc rectangular frame marked as uplink reception of a serving base station, and both a first uplink subframe and a next subframe of the first uplink subframe use a short frame in FIG. 7.

Therefore, optionally, before step 340, this embodiment of the present invention may further include the following steps.

Step 330*a*1: The first base station determines a subframe format in which the terminal device performs uplink transmission, where the subframe format is less than or equal to a subframe format with 1 ms, and the subframe format ensures that the first uplink subframe does not overlap with a next subframe of the first uplink subframe, or ensures that the first uplink subframe does not overlap with a part except a cyclic prefix (CP) of a next subframe of the first uplink subframe.

Step 330*a*2: The first base station notifies the terminal device of the subframe format.

It should be noted that, when the subframe format is equal to the subframe format with 1 ms, the base station may not notify the terminal device of the subframe format.

In this embodiment of the present invention, the subframe format is notified to the terminal device, so that a symbol of a subframe (namely, the first uplink subframe) in which interference cancellation is performed does not affect normal sending and receiving of the next subframe of the first uplink subframe.

Specifically, the first base station and the terminal device predefine a new subframe format for uplink transmission. There may be one or more new subframe formats. The new subframe format includes a format of a subframe in which interference cancellation is performed, or may include a format of a subframe in which interference cancellation is not performed. The subframe format includes at least one of a quantity of symbols included in a subframe, a sequence number of a starting symbol in the subframe, or a sequence number of an ending symbol in the subframe. For example, one subframe in an existing LTE or LTE-A system may include 14 symbols. A newly defined subframe format in this embodiment of the present invention may be 10 symbols. To be specific, a signal is transmitted on only 10 of the existing 14 symbols, for example, a signal is transmitted on 10 symbols in which a sequence number of a starting symbol is 3, and a sequence number of an ending symbol is 12, and remaining 4 symbols (namely, symbols 0 to 2 and a symbol 13) are not used to transmit the signal.

The subframe format may be a subframe format of the first uplink subframe, or may be a subframe format of a next subframe of the first uplink subframe, or may be a subframe format of the first uplink subframe and a next subframe of the first uplink subframe.

In this case, in a possible implementation of step 330a2, the first base station dynamically notifies the terminal device of a subframe format used by the first uplink subframe and/or a next subframe of the first uplink subframe. The subframe format may be notified by using separate signaling. The first base station may further notify the subframe format together with the indication information in step 330. To be specific, the indication information in step 330 further indicates the subframe format determined by the first base station.

As shown in Table 3, the base station may notify, by using two bits, whether interference cancellation is performed in the first uplink subframe, and a subframe format of the first uplink subframe and/or a next subframe of the first uplink subframe. For example, when the two bits are 00, it indicates that interference cancellation is not performed in the first subframe and the subframe format is a format 0.

TABLE 3

| Signaling value | Interference cancellation | Subframe format |
| --- | --- | --- |
| 00 | Interference cancellation is not performed in the first subframe. | Format 0 |
| 01 | Interference cancellation is performed in the first subframe. | Format 0 |
| 10 | Interference cancellation is performed in the first subframe. | Format 1 |
| 11 | Interference cancellation is performed in the first subframe. | Format 2 |

In another possible implementation of step 330a2, the first base station semi-statically configures a format of an uplink subframe of the terminal device in a period of time, or configures a subframe format used by an uplink subframe in which the terminal device performs interference cancellation in a period of time. For example, the first base station indicates a format of an uplink subframe in a period of time by using higher layer signaling, such as MAC layer signaling or radio resource control (RRC) signaling. After receiving the indication information, the terminal device determines sending time of the uplink subframe based on the first time adjustment parameter within time indicated by the indication information.

It should be noted that in all the possible solutions in the foregoing embodiment, step 330 may be performed with step 320. In other words, the first base station sends the first indication information to the terminal device while sending the first time adjustment parameter and the second time adjustment parameter to the terminal device.

The following describes an implementation in this embodiment of the present invention by using a specific time sequence relationship diagram.

FIG. 5 shows a time sequence relationship 1 according to an embodiment of the present invention. For a time domain location shown in the figure, refer to the foregoing description and details are not described herein again. A parameter $N_{TA-IC}$ in FIG. 5 is the first time adjustment parameter in this embodiment of the present invention. The parameter $N_{TA-IC}$ is determined by the first base station based on time at which a downlink signal sent by an interfering base station arrives at the first base station and time at which an uplink signal sent by the terminal device arrives at the first base station.

The first base station sends the parameter $N_{TA-IC}$ to the terminal device, and the terminal device determines, based on the parameter $N_{TA-IC}$, a starting location at which the terminal device sends the uplink signal. Compared with the prior art shown in FIG. 2, in this embodiment of the present invention, after a time domain starting location at which the terminal device sends an uplink subframe of an uplink signal is adjusted, arrival time (namely, arrival time corresponding to the uplink subframe) at which the uplink signal arrives at the first base station and time at which the downlink signal of the interfering base station arrives at a time domain location of the first base station are aligned in terms of a symbol. It should be noted that in the schematic diagram of a time sequence relationship shown in this embodiment of the present invention, a starting location of the first base station at which the uplink signal arrives is exactly aligned with a time domain starting location of the first base station at which the downlink signal of the interfering base station arrives. However, this is not limited in this embodiment of the present invention, and alignment of the starting locations of the uplink signal and the downlink signal is only a special case. As long as the arrival time of the uplink signal to the first base station is aligned with the time domain location of the first base station at which the downlink signal of the interfering base station arrives in terms of a symbol, the starting locations of the uplink signal and the downlink signal may not be aligned. In this case, the first base station only needs to perform interference cancellation on a part that is in the uplink signals and that overlaps with interference signals.

In addition, in the time sequence relationship 1, a length of the uplink subframe of the uplink signal sent by the terminal device is also shortened, so that a time domain ending location that the uplink signal arrives at the first base station is before a time domain ending location at which the first base station receives the uplink subframe. In other words, a right boundary of the arc rectangular frame marked as uplink arrival of a terminal device is located on a left side of a vertical dashed line on a right side in FIG. 4. In this case, the subframe format is a subframe format of the first uplink subframe.

FIG. 6 is a schematic diagram of a time sequence relationship 2 according to an embodiment of the present invention. Unlike FIG. 5, a short frame is used for a next subframe of a first uplink subframe in FIG. 6, as shown in an arc rectangular frame marked as uplink reception of a serving base station. In this case, the subframe format is a subframe format of a next subframe of the first uplink subframe.

FIG. 7 is a schematic diagram of a time sequence relationship 3 according to an embodiment of the present invention. Unlike FIG. 5, a short frame is used for both a first uplink subframe and a next subframe of the first uplink subframe in FIG. 7. In this case, the subframe format is a subframe format of a next subframe of the first uplink subframe. The first uplink subframe and a next subframe of the first uplink subframe may use a same subframe format. Certainly, the first uplink subframe and a next subframe of the first uplink subframe may also use different subframe formats.

According to another aspect, this embodiment of the present invention may further be applied to a scenario in which transmission is performed by using a self-contained subframe. As shown in FIG. 7, in a time interval of 1 ms, a base station (including a serving base station and an interfering base station) first performs downlink transmission, as shown in an arc rectangular frame marked as downlink transmission of a base station, and then receives, in the time interval, an uplink signal sent by a terminal device, as shown in an arc rectangular frame marked as uplink arrival of a terminal device. It may be learned that the serving base station receives some downlink signals sent by the interfering base station while receiving the uplink signal, for example, a part between two vertical dashed lines in FIG. 7. Therefore, in this embodiment of the present invention, a value of the foregoing parameter $N_{TA\text{-}IC}$ of the device may be used to adjust a starting location at which the terminal device sends the uplink signal, so that time at which the uplink signal of the terminal device arrives at the serving base station is aligned with time at which the downlink signal sent by the interfering base station arrives at the serving base station in terms of a time domain symbol. In this way, a base station in a serving cell can perform interference cancellation on the downlink signal of the interfering base station.

In the technical solution of the prior art, each terminal device has only one parameter that determines an uplink signal sending time point, and an uplink signal sent by a terminal device is not aligned with a downlink signal sent by a neighboring base station in a serving base station. However, in this embodiment of the present invention, the first time adjustment parameter is set, so that the uplink signal sent by the terminal device is aligned with the downlink signal sent by the neighboring base station at a base station in a serving cell in terms of a time domain symbol, thereby implementing interference cancellation.

Figure 8:
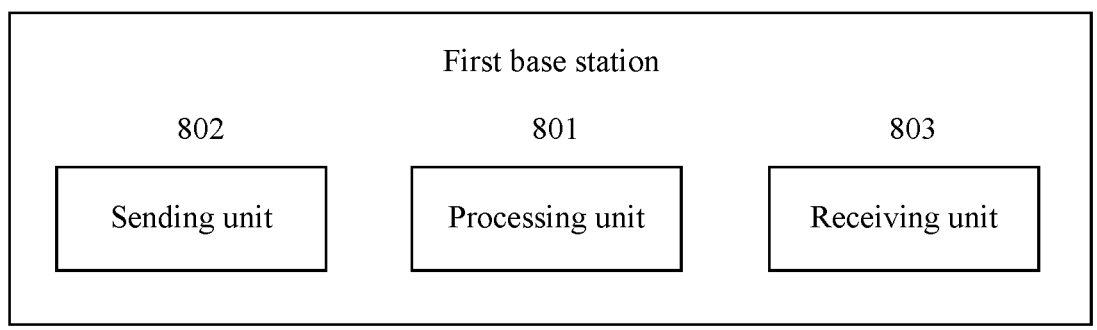
FIG. 8 is a possible schematic structural diagram of a first base station according to an embodiment of the present invention.

FIG. 8 is a possible schematic structural diagram of a first base station used in a first embodiment of the present invention.

The first base station includes a processing unit 801, a sending unit 802, and a receiving unit 803, and may further include a storage unit (not shown in the figure) based on an actual requirement.

The processing unit 801 is configured to determine a first time adjustment parameter and a second time adjustment parameter.

The sending unit 802 is configured to send the first time adjustment parameter and the second time adjustment parameter to a terminal device.

The sending unit 802 is further configured to send first indication information to the terminal device, where the first indication information indicates one of the first time adjustment parameter and the second time adjustment parameter.

The receiving unit 803 is configured to receive an uplink signal sent by the terminal device.

The first base station is a serving base station of the terminal device. The first time adjustment parameter and the second time adjustment parameter are separately used by the terminal device to determine to send timing of the uplink signal to the first base station.

In an optional embodiment, the processing unit 801 is further configured to determine the first time adjustment parameter based on arrival time of an interference signal. The interference signal is a downlink signal that is sent by an interfering base station and that is received by the receiving unit 803. The interfering base station and the first base station use a same frequency band.

Optionally, the first time adjustment parameter is used to adjust starting time of a first time period as follows: arrival time that is to the first base station and that is corresponding to the first time period is aligned with the arrival time of the interference signal to the first base station in terms of a time domain symbol. The first time period is duration in which the terminal device sends the uplink signal to the first base station.

Optionally, the processing unit 801 is further configured to determine a length of the first time period. Then, the sending unit 802 sends second indication information to the terminal device based on the length. The second indication information is used to indicate a subframe format. The subframe format includes at least one of a time domain symbol quantity, a symbol starting location, and a symbol ending location. The subframe format ensures that the first time period does not overlap with a next subframe of a first subframe in which the first time period is located, or ensures that the first time period does not overlap with a part except a cyclic prefix part of a next subframe of the first subframe in which the first time period is located.

Further, optionally, the subframe format indicated by the second indication information is a subframe format of the first time period and/or a subframe format of a next subframe of the first time period.

In still another optional embodiment, the processing unit 801 is configured to determine the second time adjustment parameter based on receiving time of the uplink signal.

Optionally, the second time adjustment parameter is used to adjust starting time of a first time period as follows: arrival time that is to the first base station and that is corresponding to the first time period is aligned with the receiving time of the uplink signal of the first base station in terms of a time domain symbol. The first time period is duration in which the terminal device sends the uplink signal to the first base station.

In yet another optional embodiment, the first indication information includes a notification indicating whether an interference cancellation operation is performed in a period of time. The notification is used to instruct the terminal device to determine the starting time of the first time period based on one of the first time adjustment parameter and the second time adjustment parameter.

In yet another optional embodiment, the first time adjustment parameter is one or more time adjustment parameters.

Optionally, the processing unit 801 determines at least one interfering base station, where each interfering base station corresponds to one first time adjustment parameter.

Specifically, the processing unit 801 determines a first time adjustment parameter corresponding to each interfering base station based on a distance between the processing unit 801 and each interfering base station. The first time adjustment parameter is used to adjust the starting time of a first uplink subframe as follows: the arrival time that is to the first base station and that is corresponding to the first uplink subframe is aligned with the arrival time that is of the interference signal of the interfering base station corresponding to the first time adjustment parameter and that is to the first base station in terms of a time domain symbol.

Specifically, the sending unit 802 is configured to send the at least one first time adjustment parameter and the second time adjustment parameter to the terminal device. For example, the sending unit 802 sends the first time adjustment parameter and the second time adjustment parameter in a semi-static mode.

It should be noted that each unit of the first base station performs information exchange, an execution process, and other content of the method in an embodiment of the present invention. For details, refer to the description in the method embodiment. In addition, the embodiment of the first base station is based on a concept the same as that of the foregoing method embodiment, and brings a technical effect the same as that of the method embodiment of the present invention. For specific content, refer to the description in the method embodiment of the present invention, which is not repeated herein.

Figure 9:
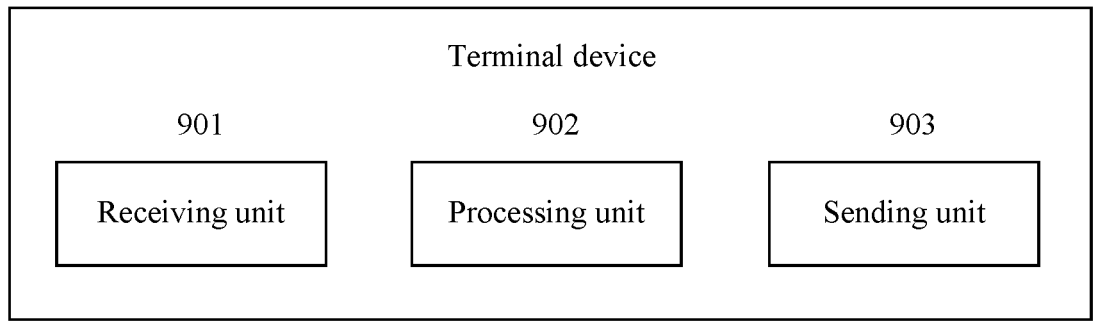
FIG. 9 is a possible schematic structural diagram of a terminal device according to an embodiment of the present invention.

FIG. 9 is a possible schematic structural diagram of a terminal device used in a first embodiment of the present invention.

The terminal device includes a receiving unit 901, a processing unit 902, and a sending unit 903, and may further include a storage unit (not shown in the figure) based on an actual requirement.

The receiving unit 901 is configured to receive a first time adjustment parameter and a second time adjustment parameter from a first base station.

The receiving unit 901 is further configured to receive first indication information from the first base station, where the first indication information indicates one of the first time adjustment parameter and the second time adjustment parameter.

The processing unit 902 determines starting time for sending an uplink signal based on the first indication information.

The sending unit 903 is configured to send the uplink signal to the first base station.

The first base station is a serving base station of the terminal device. The first time adjustment parameter and the second time adjustment parameter are separately used by the terminal device to determine to send timing of the uplink signal to the first base station.

In an optional embodiment, the processing unit 902 determines the starting time for sending the uplink signal based on the first indication information.

For example, the first indication information indicates the first time adjustment parameter, and the processing unit 902 determines starting time for sending the uplink signal based on the first time adjustment parameter, so that arrival time of the uplink signal to the first base station is aligned with arrival time of an interference signal to the first base station in terms of a time domain symbol. The interference signal is a downlink signal sent by an interfering base station. The interfering base station and the first base station use a same frequency band.

Optionally, the receiving unit 901 receives second indication information from the first base station. The second indication information is used to indicate a subframe format. The subframe format includes at least one of a time domain symbol quantity, a symbol starting location, and a symbol ending location. The subframe format ensures that the uplink signal does not overlap with a next subframe of a first subframe in which the uplink signal is located, or ensures that the uplink signal does not overlap with a part except a cyclic prefix part of a next subframe of the first subframe in which the uplink signal is located.

The subframe format indicated by the second indication information is a subframe format of the uplink signal and/or a subframe format of a next subframe of a subframe in which the uplink signal is located. In this case, the sending unit 903 is configured to send, to the first base station based on the subframe format, a first subframe in which the uplink signal is located, or a next subframe of the subframe in which the uplink signal is located.

For another example, the first indication information indicates the second time adjustment parameter, and the processing unit 902 determines starting time for sending the uplink signal based on the second time adjustment parameter, so that arrival time of the uplink signal to the first base station is aligned with uplink signal receiving time of the first base station in terms of a time domain symbol.

In still another optional embodiment, the first indication information includes a notification indicating whether an interference cancellation operation is performed in a period of time. The processing unit 902 determines one of the first time adjustment parameter and the second time adjustment parameter based on the notification.

In yet another optional embodiment, the first time adjustment parameter is one or more first time adjustment parameters.

Specifically, the receiving unit 901 receives the one or more first time adjustment parameters and the second time adjustment parameter, and receives the first indication information.

When the first indication information indicates one first time adjustment parameter, the processing unit 902 determines the starting time for sending the uplink signal based on the first time adjustment parameter. The first time adjustment parameter is used to adjust the starting time of the first uplink subframe as follows: the arrival time of the uplink signal to the first base station is aligned with the arrival time that is of the interference signal of the interfering base station corresponding to the first time adjustment parameter and that is to the first base station in terms of a time domain symbol.

An embodiment of the present invention further provides a first base station, including:

a processing unit, configured to determine a first time adjustment parameter and a second time adjustment parameter; and a sending unit, configured to send the first time adjustment parameter and the second time adjustment parameter to a terminal device, where the first time adjustment parameter and the second time adjustment parameter are used to instruct a first timing advance and a second timing advance for the terminal device sending an uplink signal to the first base station.

The sending unit is further configured to send first indication information to the terminal device, where the first indication information is used to instruct the terminal device to use one of the first timing advance and the second timing advance.

In an optional implementation, the processing unit is configured to determine the first time adjustment parameter based on arrival time of an interference signal. The interference signal is a downlink signal sent by an interfering base station. The interfering base station and the first base station use a same frequency band.

In an optional implementation, that the first base station determines the second time adjustment parameter includes:

the first base station determines the second time adjustment parameter based on a random access preamble signal sent by the terminal device.

In an optional implementation, the first timing advance is configured to enable a symbol of the uplink signal to be aligned with a symbol of the interference signal.

In an optional implementation, the first indication information is used to instruct the terminal device to use the first timing advance for a first transmission time unit.

In an optional implementation, the sending unit is further configured to send second indication information to the terminal device, where the second indication information is used to indicate a quantity of valid symbols in the first transmission time unit or a quantity of valid symbols in a second transmission time unit, and the second transmission time unit is a previous transmission time unit or a next transmission time unit of the first transmission time unit.

In an optional implementation, the quantity of valid symbols in the first transmission time unit is greater than the quantity of valid symbols in the second transmission time unit, or the quantity of valid symbols in the first transmission time unit is less than the quantity of valid symbols in the second transmission time unit.

In an optional implementation, the second transmission time unit is a transmission time unit for transmitting the uplink signal by using the second timing advance, or the second transmission time unit is a transmission time unit for transmitting the downlink signal.

When the first timing advance is greater than the second timing advance, the second transmission time unit is the previous transmission time unit of the first transmission time unit; and/or when the first timing advance is less than the second timing advance, the second transmission time unit is a next transmission time unit of the first transmission time unit.

In an optional implementation, a first transmission time period is a time period in which the uplink signal is transmitted by using the first timing advance for the first transmission time unit, and a second transmission time period is a time period in which the uplink signal is transmitted by using the second timing advance for the second transmission time unit, or the second transmission time period is a time period in which the downlink signal is transmitted.

The first transmission time period does not overlap with the second transmission time period, or parts except a cyclic prefix do not overlap.

In an optional implementation, the first time adjustment parameter is used to indicate an offset, and the offset is an offset of the first timing advance relative to the second timing advance.

In an optional implementation, the first indication information includes a notification indicating whether an interference cancellation operation is performed in a period of time.

In an optional implementation, the first time adjustment parameter is dedicated for the terminal device, or the first time adjustment parameter is shared by terminal devices in a cell of the first base station.

In an optional implementation, the sending the first time adjustment parameter and the second time adjustment parameter to a terminal device includes:

sending the first time adjustment parameter and the second time adjustment parameter to the terminal device in a semi-static mode.

An embodiment of the present invention further provides a terminal device, including:

a receiving unit, configured to receive a first time adjustment parameter and a second time adjustment parameter from a first base station, where the first time adjustment parameter and the second time adjustment parameter are used to instruct a first timing advance and a second timing advance for the terminal device sending an uplink signal to the first base station, the receiving unit is further configured to receive first indication information from the first base station, and the first indication information is used to indicate one of the first timing advance and the second timing advance;

a processing unit, configured to determine one of the first timing advance and the second timing advance based on the first indication information; and a sending unit, configured to transmit the uplink signal by using the determined timing advance.

In an optional implementation, the sending unit is further configured to send a random access preamble signal to the first base station, where the random access preamble signal is used to determine the second time adjustment parameter.

In an optional implementation, the first timing advance is configured to enable a symbol of the uplink signal to be aligned with a symbol of the interference signal.

In an optional implementation, the first indication information is used to instruct the terminal device to use the first timing advance for a first transmission time unit.

In an optional implementation, the receiving unit is further configured to receive second indication information from the first base station, where the second indication information is used to indicate a quantity of valid symbols in the first transmission time unit or a quantity of valid symbols in a second transmission time unit, and the second transmission time unit is a previous transmission time unit or a next transmission time unit of the first transmission time unit.

In an optional implementation, the quantity of valid symbols in the first transmission time unit is greater than the quantity of valid symbols in the second transmission time unit, or the quantity of valid symbols in the first transmission time unit is less than the quantity of valid symbols in the second transmission time unit.

In an optional implementation, the second transmission time unit is a transmission time unit for transmitting the uplink signal by using the second timing advance, or the second transmission time unit is a transmission time unit for transmitting the downlink signal.

When the first timing advance is greater than the second timing advance, the second transmission time unit is the previous transmission time unit of the first transmission time unit; and/or when the first timing advance is less than the second timing advance, the second transmission time unit is a next transmission time unit of the first transmission time unit.

In an optional implementation, a first transmission time period is a time period in which the uplink signal is transmitted by using the first timing advance for the first transmission time unit, and a second transmission time period is a time period in which the uplink signal is transmitted by using the second timing advance for the second transmission time unit, or the second transmission time period is a time period in which the downlink signal is transmitted.

The first transmission time period does not overlap with the second transmission time period, or parts except a cyclic prefix do not overlap.

In an optional implementation, the first time adjustment parameter is used to indicate an offset, and the offset is an offset of the first timing advance relative to the second timing advance.

In an optional implementation, the first indication information includes a notification indicating whether an interference cancellation operation is performed in a period of time.

In an optional implementation, the first time adjustment parameter is dedicated for the terminal device, or the first time adjustment parameter is shared by terminal devices in a cell of the first base station.

In an optional implementation, that the terminal device receives the first time adjustment parameter and the second time adjustment parameter from the first base station includes: receiving the first time adjustment parameter and the second time adjustment parameter from the first base station in a semi-static mode.

It should be noted that each unit of the terminal device performs information exchange, an execution process, and other content of the method in the embodiments of the present invention. For details, refer to the description in the method embodiment. In addition, the embodiment of the first base station is based on a concept the same as that of the foregoing method embodiment, and brings a technical effect the same as that of the method embodiment of the present invention. For specific content, refer to the description in the method embodiment of the present invention, which is not repeated herein.

It should be noted that in the foregoing base station and user equipment embodiments, division of each functional unit is only an example for description. In actual application, based on a requirement, for example, based on a configuration requirement of corresponding hardware or consideration of convenience for implementation of software, the foregoing functions may be allocated to different functional units for completion. In other words, internal structures of the user equipment and the base station are divided into different functional units, so as to complete all or some functions described above. Moreover, in actual application, corresponding functional units in the embodiments may be implemented by corresponding hardware, or may be completed by corresponding hardware by executing corresponding software; for example, the foregoing sending unit may be hardware that has a function of executing the foregoing sending unit, such as a transmitter, or may be a general processor or another hardware device that can execute a corresponding computer program to complete the foregoing functions; for another example, the foregoing processing unit may be hardware that has a function of executing the processing unit, such as a processor, or may be another hardware device that can execute a corresponding computer program to complete the foregoing functions; for still another example, the foregoing receiving unit may be hardware that has a function of executing the foregoing receiving unit, such as a receiver, or may be a general processor or another hardware device that can execute a corresponding computer program to complete the foregoing functions (the foregoing description principle may be applied to each embodiment provided in this specification).

A person of ordinary skill in the art may understand that all or some of the steps of the methods in the embodiments may be implemented by a program instructing related hardware. The program may be stored in a computer readable storage medium. The storage medium may include a read-only memory (ROM), a random access memory (RAM), a magnetic disk, an optical disc, or the like.

It should be understood that "one embodiment", "an embodiment", or "an embodiment of the present invention" mentioned in the whole specification means that particular features, structures, or characteristics related to the embodiment are included in at least one embodiment of the present invention. Therefore, "in one embodiment", "in an embodiment", or "in an embodiment of the present invention" that appears throughout the specification does not necessarily mean a same embodiment. Moreover, the particular features, structures, or characteristics may be combined in one or more embodiments in any proper manner.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

It should be understood that in the embodiments of this application, "B corresponding to A" indicates that B is associated with A, and B may be determined according to A. However, it should further be understood that determining B according to A does not mean that B is determined only according to A; B may also be determined according to A and/or other information.

The foregoing describes in detail the method, the user equipment, and the base station provided in the embodiments of the present invention. In this specification, specific examples are used to describe the principle and implementations of the present invention, and the description of the embodiments is intended only to help understand the method and core idea of the present invention. Meanwhile, a person of ordinary skill in the art may, based on the idea of the present invention, make modifications with respect to the specific implementations and the application scope. Therefore, the content of this specification shall not be construed as a limitation on the present invention.

What is claimed is:

1. A communication method, wherein the method comprises:
    determining, by a first base station, a first time adjustment parameter and a second time adjustment parameter, wherein the first time adjustment parameter is based on an arrival time of an interference signal, and wherein the interference signal is a downlink signal sent by an interfering base station, and the interfering base station and the first base station use a same frequency band;
    sending, by the first base station, the first time adjustment parameter and the second time adjustment parameter to a terminal device, wherein the first time adjustment parameter and the second time adjustment parameter are used to instruct a first timing advance and a second timing advance for the terminal device sending an uplink signal to the first base station; and
    sending, by the first base station, first indication information to the terminal device, wherein the first indication information is used to instruct the terminal device to use one of the first timing advance and the second timing advance.

2. The method according to claim 1, wherein the determining, by a first base station, a second time adjustment parameter comprises:
    determining, by the first base station, the second time adjustment parameter based on a random access preamble signal sent by the terminal device.

3. The method according to claim 1, wherein the first indication information is used to instruct the terminal device to use the first timing advance for a first transmission time unit.

4. The method according to claim 3, further comprising:
    sending, by the first base station, second indication information to the terminal device, wherein the second indication information is used to indicate a quantity of valid symbols in the first transmission time unit or a quantity of valid symbols in a second transmission time unit, and the second transmission time unit is a previous transmission time unit or a next transmission time unit of the first transmission time unit.

5. The method according to claim 1, wherein the first time adjustment parameter is used to indicate an offset, and the offset is an offset of the first timing advance relative to the second timing advance.

6. The method according to claim 1, wherein the first time adjustment parameter is dedicated for the terminal device, or the first time adjustment parameter is shared by terminal devices in a cell of the first base station.

7. An apparatus, comprising: one or more processors, and a non-transitory storage medium configure to store program instructions; wherein, when executed by the one or more processors, the instructions cause the apparatus to perform a method that comprises:
determining, by the apparatus, a first time adjustment parameter and a second time adjustment parameter, wherein the first time adjustment parameter is based on an arrival time of an interference signal, and wherein the interference signal is a downlink signal sent by an interfering apparatus, and the interfering apparatus and the apparatus use a same frequency band;
sending, by the apparatus, the first time adjustment parameter and the second time adjustment parameter to a terminal device, wherein the first time adjustment parameter and the second time adjustment parameter are used to instruct a first timing advance and a second timing advance for the terminal device sending an uplink signal to the apparatus; and
sending, by the apparatus, first indication information to the terminal device, wherein the first indication information is used to instruct the terminal device to use one of the first timing advance and the second timing advance.

8. The apparatus according to claim 7, wherein that the apparatus determines the second time adjustment parameter comprises:
the apparatus determines the second time adjustment parameter based on a random access preamble signal sent by the terminal device.

9. The apparatus according to claim 7, wherein the first indication information is used to instruct the terminal device to use the first timing advance for a first transmission time unit.

10. The apparatus according to claim 9, wherein the sending unit is further configured to send second indication information to the terminal device, the second indication information is used to indicate a quantity of valid symbols in the first transmission time unit or a quantity of valid symbols in a second transmission time unit, and the second transmission time unit is a previous transmission time unit or a next transmission time unit of the first transmission time unit.

11. The apparatus according to claim 7, wherein the first time adjustment parameter is used to indicate an offset, and the offset is an offset of the first timing advance relative to the second timing advance.

12. The apparatus according to claim 7, wherein the first time adjustment parameter is dedicated for the terminal device, or the first time adjustment parameter is shared by terminal devices in a cell of the apparatus.

13. An apparatus, comprising: one or more processors, and a non-transitory storage medium configure to store program instructions; wherein, when executed by the one or more processors, the instructions cause the apparatus to perform a method that comprises:
receiving, by the apparatus, a first time adjustment parameter and a second time adjustment parameter from a first base station, wherein the first time adjustment parameter and the second time adjustment parameter are used to instruct a first timing advance and a second timing advance for the apparatus sending an uplink signal to the first base station, and wherein the first time adjustment parameter is based on an arrival time of an interference signal, and wherein the interference signal is a downlink signal sent by an interfering base station, and the interfering base station and the first base station use a same frequency band;
receiving, by the apparatus, first indication information from the first base station, wherein the first indication information is used to indicate one of the first timing advance and the second timing advance;
determining, by the apparatus, one of the first timing advance and the second timing advance based on the first indication information; and
transmitting, by the apparatus, the uplink signal by using the determined timing advance.

14. The apparatus according to claim 13, wherein the first indication information is used to instruct the apparatus to use the first timing advance for a first transmission time unit.

15. The apparatus according to claim 13, receiving, by the apparatus, second indication information from the first base station, wherein the second indication information is used to indicate a quantity of valid symbols in the first transmission time unit or a quantity of valid symbols in a second transmission time unit, and the second transmission time unit is a previous transmission time unit or a next transmission time unit of the first transmission time unit.

16. The apparatus according to claim 15, wherein the second transmission time unit is a transmission time unit for transmitting the uplink signal by using the second timing advance, or the second transmission time unit is a transmission time unit for transmitting the downlink signal; and
when the first timing advance is greater than the second timing advance, the second transmission time unit is the previous transmission time unit of the first transmission time unit; and/or when the first timing advance is less than the second timing advance, the second transmission time unit is a next transmission time unit of the first transmission time unit.

17. The apparatus according to claim 13, wherein the first time adjustment parameter is used to indicate an offset, and the offset is an offset of the first timing advance relative to the second timing advance.

18. The apparatus according to claim 13, wherein the first time adjustment parameter is dedicated for the apparatus, or the first time adjustment parameter is shared by apparatuses in a cell of the first base station.

* * * * *